United States Patent [19]

Vetter

[11] Patent Number: 4,883,094

[45] Date of Patent: Nov. 28, 1989

[54] APPARATUS FOR SEALING PIPE

[76] Inventor: Manfred Vetter, Burg Langendorf, D-5352 Zülpich, Fed. Rep. of Germany

[21] Appl. No.: 192,828

[22] Filed: May 11, 1988

[30] Foreign Application Priority Data

May 11, 1987 [DE] Fed. Rep. of Germany ....... 3715645

[51] Int. Cl.$^4$ .............................................. F16L 55/12
[52] U.S. Cl. ..................................................... 138/89
[58] Field of Search .................... 138/89, 93, 90; 383/3

[56] References Cited

U.S. PATENT DOCUMENTS

| 827,835 | 8/1906 | White | 138/93 |
| 1,644,096 | 10/1927 | Voit | 383/3 |
| 2,678,666 | 5/1954 | Theis et al. | 138/93 |
| 3,459,230 | 8/1969 | Smith | 138/93 |
| 4,079,755 | 3/1978 | Lans | 138/93 |
| 4,083,384 | 4/1978 | Horne et al. | 138/93 |
| 4,377,184 | 3/1983 | Vetter | 138/93 |
| 4,526,207 | 7/1985 | Burkley et al. | 138/93 |

FOREIGN PATENT DOCUMENTS 0016045 of 1928 Australia ................................ 383/3

Primary Examiner—James E. Bryant, III
Attorney, Agent, or Firm—K. S. Cornaby

[57] ABSTRACT

The pipe sealing pad has a cylindrical sleeve (20) which is made of reinforced rubber material and two end walls (30) which are also made of rubber material. They are joined together in one single vulcanization procedure involving heat and define an air-tight inner compartment (34) which can be accessed via an air connection (32) in the form of a pipe fitting (42). Internally, the connection (32) merges into a ring-disk (46) which is connected to the pipe fitting (42) only in the region of its inner area (48). This ring-disk is not connected to either the pipe fitting (42) or the end wall (30) in a ring-shaped concentric compensation zone (50) which adjoins. It is connected on an outer area (52) with an inner surface (54) of the end wall (30).

11 Claims, 1 Drawing Sheet

APPARATUS FOR SEALING PIPE

BACKGROUND OF THE INVENTION

The invention pertains to a pipe sealing pad having a cylindrical, external sleeve of reinforced rubber material and two end walls which are also made of rubber. The sleeve and the end walls are joined together by heat-vulcanization and define an air-tight compartment which is accessible via a connection comprising a pipe fitting which is attached to one of the two faces. The pipe fitting inside the air-tight compartment is connected to a rubber ring disk which is connected to the inner surface of the end wall in question so as to be hermetically sealed.

Such pipe sealing pads generally have either a purely cylindrical form or a ring shape. With respect to the ring-shaped pipe sealing pads, a cylindrical sleeve into which a purely cylindrical pipe sealing pad can be inserted is generally attached to, or incorporated in, the construction. In addition, there are pipe sealing pads fitted with connecting pipeing between both end walls of the sealing pad. Such pipe sealing pads are frequently designated 'testing pads'. These piipe sealing devices may be used for sealing off piping quickly, especially if the pipe has been damaged or has sprung a leak. The piping can be blocked off quickly, reliably and eminently practically above the section to be tested or repaired. In this way damage which could ensue because of the defective piping—damage such as pollution due to the discharge or spreading of waste water or other liquids which would contaminate ground water—can be reduced to a minimum.

The pipe sealing pad of the type named above, described in the U.S. Pat. No. 4,377,184 has cup shaped end walls with the circular, cylindrical wall sections being turned inwardly, and vulcanized to the inner surface of the sleeve, tapering like an arrow to the free edge. The sleeve is reinforced along the axis. With respect to this type of seal, however, it is a disadvantage that it cannot be vulcanized under heat in one single operation. Rather, the sleeve must first be connected to one of the end walls, whereupon in the second process of vulcanization it is connected to the second end wall, which for this purpose has an innter supporting component in the internal compartment.

In addition, the connection between the air attachment and the pertinent end wall is a weak point. This becomes evident when the sealing pad is frequently used; i.e., during inflation, the pipe sealing pad blows up just like a cask. The sleeve assumes the greatest diameter in the vicinity of its longitudinal center, and from this position the diameter declines as it progresses towards both faces, while the diameter of the two end walls remains particlally unchanged, although they do bulge out convexly. Thus, the material of the pertinent end wall sited near, or attached to, the ring disk is drawn out and away from the pipe fitting. The opening through which the pipe fitting passes, which is a weak point anyway, is enlarged. This expansion in the region of the pipe fitting leads, especially after a number of inflations, to a gradual weakening of the union between the pipe fitting or the ring disk and the section of the end walls to which this is joined. The connection gets progressively weaker and there is a danger that it will start to leak.

This effect is combatted in the already existing pads of the kind described above by reinforcing the sleeve but not the end walls of the sealing pads. In this way the end walls have a greater elasticity than the sleeve which, because it is reinforced, is for all practical purposes incapable of expansion in the direction in which it is reinforced. This type of construction nevertheless poses problems by reason of the fact that if the side walls are made of material of the same strength as the sleeve they expand vigorously when inflated, thereby causing suction forces in the vicinity of the air connection. For this reason the end walls are usually constructed very thick so that they do not pull out of shape. But if this is done the pad is rendered heavy, a lot of material is required, and the connection between the sleeve and the end walls become critical. Indeed, it cannot be satisfactorily resolved on a permanent basis.

With respct to the pipe sealing pads in U.S. Pat. No. 3,459,230, the sleeve and the end walls are, to be sure, constructed in one single vulcanization process, but in their construction an inner, essentially can-shaped supporting frame made of metal is utilized. This supporting frame then remains in the inner compartment. This is a disadvantage. The air connection is attached externally to the one face of the pad, and the connecting ring disk which is joined to the rubber pipe support is vulcanized eccentrically on the outside of one of the end walls. But in this type or model, the ring disk has to perform all of the expansion movements to which the pertinent end wall is subjected during inflation. The expansions which occur during this process cause in time damage to the connection between the ring disk and the face of the pad, especially in view of the fact that by reason of the external arrangement of the ring disk the connection between the ring disk and the end wall is subjected to additional pressure within the compartment. In contrast, the inner pressure when the ring disk is mounted on the inside of the end wall functions as a type of reinforcing of the connection between the ring disk and the end wall of the pad.

Taking as the starting point the pipe sealing pad of the kind described initially, it was the purpose of the invention to avoid the disadvantages of this pipe sealing pad and create a pad which is so constructed in its manufacture during a single vulcanizing process that the connection of the air connection to the relevant end wall of the pad is solid and permanent. The expansion forces which invariably are generated during inflation of the sealing pad are absorbed in such a way that even over time no leaking spot will occur. The end walls can be manufactured as desired, that is, whether reinforced or not, and in whatever thickness desired, although it is preferable to have them as thin as is practicable.

DESCRIPTION OF THE INVENTION

The objectives were achieved by having the ring disk connected only in the region of its outer area to the inner surface of end wall and by allowing a ring-shaped compensation zone or equalizing space to remain free between the inner area, to which, ideally, it is attached as one piece to the pipe fitting and the outer area, that is to say, in a configuration in which the compensation zone of the ring disk is not connected to either the pipe support or the inner surface.

The ring-shaped compensation zone absorbs the expansions which unavoidably occur when the pipe sealing pad is being inflated and prevents these expansions from negatively influencing the tightness of the seal. During inflation of the pipe sealing pad, the end wall of the pad bulges out and the opening through which the fitting pipe passes gets larger, but whereas now there is in the vicinity of the opening no connection which has to be kept sealed, this movement exerts no influence on the seal. The pipe fitting is no longer directly connected to the face of the sealing pad; on the contrary, the invention uses a rather large ring disk which is considerably larger than those normally used up to now and which by reason of the compensation or equalizing zone absorbs and dissipates all resulting movements. By virtue of the internal pressure the compensating zone is pressed against the inner surface of the face of the pad and thus supported; in this way the compensating zone can be constructed primarily with respect to its compensating function, because, for all practical purposes, it is not subjected to any mechanical pressures.

In the model described in this paper, the pipe fitting can be moved to some extent laterally with reference to the face of the pad; that is, it can be pushed into the internal compartment. When the device is in use this relative movability with respect to the face of the pad is not a negative factor, because the ring disk by reason of the internal pressure is forced against the face of the pad. But now, in order to ensure that, when the device is not inflated, through forgetfulness or clumsiness, the pipe fitting is not pressed too far into the inner compartment, which would result in the ring disk exerting pressure on the end wall of the pad, the pipe fitting is reinforced to such an extent on the outside of the opening that by reason of the reinforcing it cannot for all practical purposes, be pushed into the inner compartment of the sealing pad. In the invention, an arrest or stop in the form of a nut or a washer is attached on the outer surface of the face of the pad on the support pipe.

The pipe fitting can be manufactured from rubber or metal. If manufactured out of metal, the design shown herein is especially advantageous, as metal has essentially a lesser elasticity than even strong and reinforced rubber. Moreover, connections between rubber and metal in the vicinity of the air connection cause massive problems in pipe sealing pads given the state of today's technology. It is an advantage for the pipe fitting to have an external thread that can receive the stop if it is in the form of a nut, and that at the same time serves as the connection for a connecting hose or a valve. The pipe fitting is modified in the internal chamber to the shape of a somewhat wider collar in order to ensure the greatest possible surface connection with the ring disk. Because the connection between the metal pipe fitting and the rubber ring disk is not subjected to mechanical stresses during inflation by reason of the fact that the expansion which occurs is absorbed by the compensating zone, the connection between metal and rubber will remain tight even after very frequent use.

If the pipe fitting is made of rubber, a certain elasticity is provided, but here too the tightness of the seal is enhanced by the compensation zone. Pipe fittings made of rubber have the advantage that metal connections for high pressure hoses can be exchanged when the thread is worn or perhaps damaged. If the pipe fitting is made of metal, the exchange can be effected only by retapping the thread.

In the most desirable construction or model, the sleeve will be manufactured from a section of reinforced rubber material that is either reinforced in just one direction, that is in the direction of the axis, or that is cross-reinforced, in which case the directions of the reinforcing should run at the greatest possible angle to the direction of the axis sleeve line. Such a reinforcing along spiral lines has the advantage that the sleeve is more uniformly reinforced than if reinforced in just one direction and that, in spite of the reinforcing, it can expand adequately at its center. It is desirable that the section of reinforced rubber material be somewhat longer than is actually required for the length of the sealing pad. The overlapping sections are bent back onto the surfaces of the pad and constitute therefore a part of the end wall. Moreover, the end walls of the pads are in this way advantageously stiffened by the reinforcings. At the same time, such a method of construction renders permanently firm the connection area between the end wall and the sleeve. It is also desirable to give the end walls of the pads a convex bulge right from the beginning, as in this way the shape of the deformation which the sealing pads reveal on inflation is to a large extent predelineated. In tests it has become evident that it is desirable to have the radius of the bulge on the end wall of the pad equal to approximately half the total length of the sealing pad. In any case the radius should exceed the radius of the cylindrical sleeve when not subjected to pressure. Moreover, if the end wall of the pads are constructed as 'bullet'-shaped caps, the expansion movements during inflation are additionally reduced so that in this way too the tightness of the seal in the vicinity of the air connection is improved.

Finally, tests have also demonstrated that it is advantageous to manufacture at least one of the end walls of the sealing pad out of two identical, relatively thin caps. In such a model, the mechanical connections such as are necessary when the sealing pad is actually in use in a length of piping are attached only to the outer disk. Thus, they do not protrude as is the case in pipe sealing pads constructed using other techniques into the inner compartment; and so the tightness of the seal of the inner compartment is not impaired. One of the anchor components of an eye hook is sited between the two disks which constitute the face and therefore ensures that the tensile and pressure forces which are exerted on the ring or comparable component of the eye hook are distributed over the largest possible area. In order to decrease the rotational forces it has been found advantageous to incorporate between the ring of the eye hook and the anchor component a hinged or elastic section so that the ring of the eye hook can accommodate itself to the directions of the forces acting on it without the necessity of the anchor component having to move also.

The compensation ring can also be constructed like a bellows, for example, it can be built up using ring disks in a process which links the inner surface area of the second, supplementary compensation ring to the face of the pad and incorporates linking both ring disks on their external edge.

BRIEF DESCRIPTION OF THE DRAWINGS

Further advantages and characteristics of the invention will be evident from the claims which are sought and from the following description of models or types of the invention. These types described here are nevertheless not to be understood as limiting in any sense the claims sought in this application. They are explained in greater detail with reference to the diagram.

DETAILED DESCRIPTION OF THE ILLUSTRATED EMBODIMENTS

Figure 3:
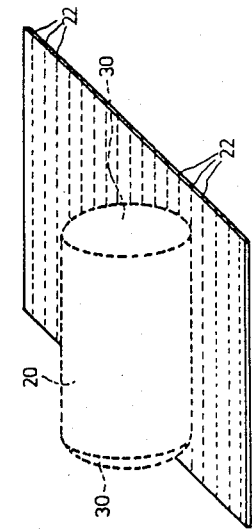
FIG. 3 is a perspective view of a rectangular shaped section of rubber and (in dotted lines) of a pad.
Figure 1:
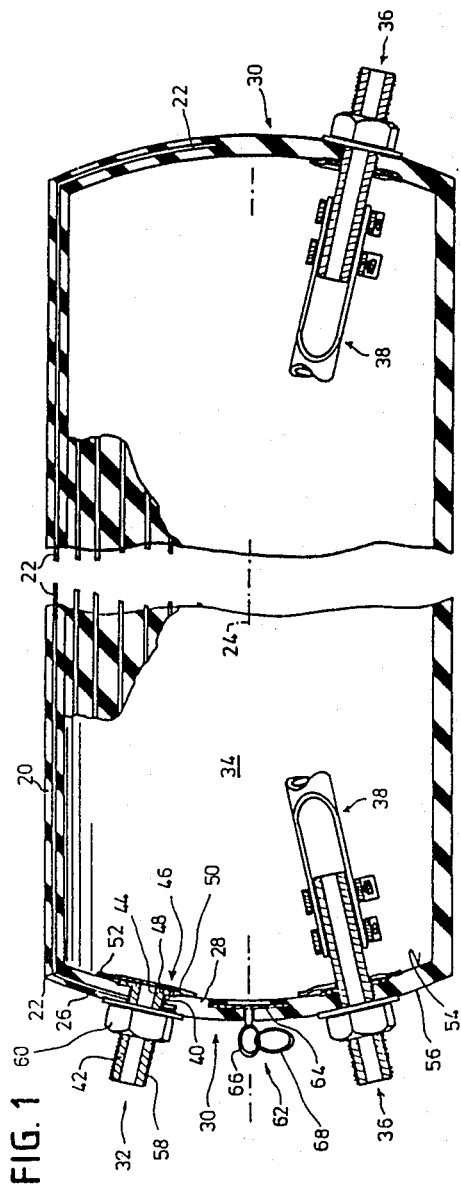
FIG. 1 shows an axial cross section through a pipe sealing pad manufactured as a testing seal. In it, an air connection and a connection for a pipe connection transversing the two end walls is shown, and both connections have metal pipe fittings.

The pipe sealing pads arein each instance shown in the non-inflated state, and their external sleeve (20) is in this state cylindrical. The sleeve (20) is made from a section of track shaped rubber material which has on its inner side reinforcing made of linear reinforcing threads. These reinforcing threads (22) are made from steel cord, polyamide, aramide, polyester or a comparable substance. In the version completed in accord with FIG. 1 only reinforcing strips running in the direction of the axis (24) were employed; at right angles to this, that is to say in the direction of the circumference, the sleeve (20) in accord with FIG. 1 is not reinforced. It may nevertheless be reinforced in this direction also, but in that case the reinforcing is considerably weaker than the reinforcing threads (22) shown. It would, for example, consist of a textile thread which was elastic.

Figure 2:
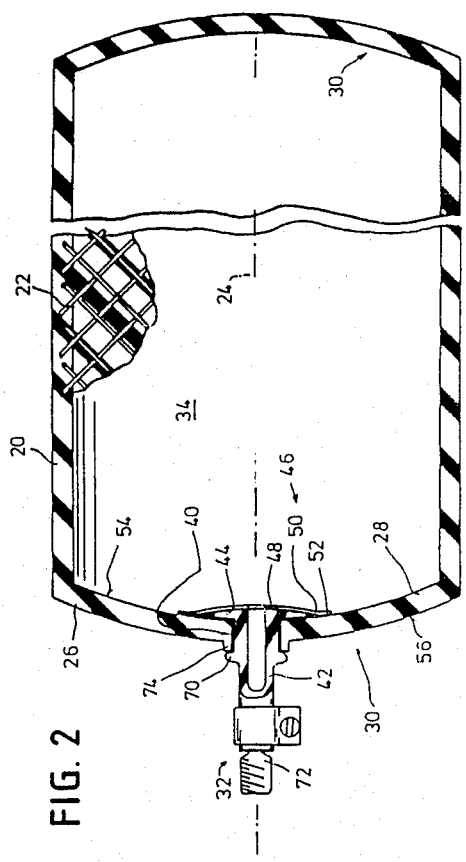
FIG. 2 is a sectional view corresponding to FIG. 1, showing just one central connection in the form of an air connection and one pipe fitting manufactured of rubber

The type manufactured according to FIG. 2 incorporates two groups of reinforcing thread (22) which bisect at right angles and which are sited at an angle of 45° to the middle axis (24), thereby forming a spiral thread which alternately corresponds to a right-hand thread, and a left hand thread. The section from which the sleeve (20) is cut is actually longer than is really necessary for its construction. The overlapping sections are bent over onto the end face of the pad and constitute together with at least one of the caps the actual end wall (30) of the pad. The section from which the sleeve is cut is in comparison to the axial length of the completed pipe sealing pad longer by approximately the radius of the pipe sealing pad. This means that the reinforcing threads (22) extend approximately as far as the axis (24). They can overlap there, but it is also possible to leave unreinforced a central section of the face of the sealing pad (30). In order that the face of the pad (30) does not get appreciably thicker in the region of the middle axis by reason of the sections which are bent over and down, it is necessary to remove rubber material before the sections are bent down. For this, a serrated cut, for example, can be made along the edge of the section. It is nevertheless most important to ensure that the reinforcing threads (22) themselves are not damaged—in other words, remove just rubber material, not reinforcing. The pipe sealing pads shown in the drawing are manufactured in one single vulcanization process. During the vulcanization process they are filed with air, whereby the prefabricated pad which is already air tight is joined into an homogeneous whole.

Each of the models manufactured according to the FIGS. 1 and 2 incorporates an air-connection (32) by means of which an internal compartment (34) can be filled or emptied with air or some other medium. In addition, the model manufactured according to FIG. 1 is a sealing pad used for the testing of pipes and has a connection (36) for a pipe (38) which transverses the whole of the pad. According to FIG. 1, a metallic pipe support (42) is inserted in an opening (40) that is in the shape of an aperture in an end wall of the pad (30). The end of this pipe fitting which is in the inner compartment (34) is modified to a disk-shaped collar which provides a flush end to the unit, the total being just one piece. This collar (44) ensures that the pipe support cannot be pulled out of the opening (40) and serves further as a seal. For this purpose it is joined—on the surface that faces inwards—to a ring disk (46) which is made from nonreinforced rubber. This ring disk (46) is relatively thin and has an elasticity considerably in excess of that of the neighboring areas (42, 30). On its inner inner area (48) it is connected circularly on its face and so as to form an air-tight seal to the circular area of the collar (44) which points inwards. Outside of this inner area it has a concentric and thus also ring-shaped compensation zone (50), and in this compensation zone the ring disk (46) is not connected to another part. Outside of this compensation zone there is an outer area (52) which is also circular; there it is tightly connected to an inner surface (54) of the end wall (30) exhibiting the opening (40) on the same side as on its inner edge area (48). The pipe fitting (42) including the collar (44) may also be connected to the inner wall of the hole (40) or, respectively, the inner surface (54). If it is connected, then this is solely for the purpose of mechanical reinforcing.

The collar (44) is relatively flat and has an external diameter which corresponds approximately to twice the external diameter of the pipe fitting (42). Its external edges are rounded so that it cannot cut into the rubber material. The pipe fitting protrudes a few centimeters beyond the outer surface (56) of the end wall (30) where it is fitted with an external thread (58) onto which are screwed a disk and a nut (60). They prevent the pipe fitting (42) from being pushed inwards so that by a combination of the collar (44) and the nut (60) the pipe fitting (42) is firmly secured. The free end of the pipe fitting (42) which projects opposite the nut (60) may be used for connecting an air-pressure hose, for inserting a valve and the like.

The connection (36) for a pipe (38) is constructed exactly as the air connection described (32). The difference is that the pipe fitting projects on the inside opposite its collar (44), and the projecting length inside is used for the already familiar connection with a flexible hose (38). Both the connections (32) and (36) are sited approximately in the middle between the center axis (24) and the cylinder described by the external casing of the sleeve. On the center axis (24) itself there is mounted an eye hook (62). This is constructed as follows: the end wall (30) is made of a cap (28) which extends to the inner surface of the jacket (20) and is manufactured from one of the bent over sections (26) of the sleeve section. Between both of them there is mounted an anchoring attachment (64) in the form of a plate that is shaped like the spherical cap. From it there extends outwards and through the area (26) a pin or shaft which blends into an eye (66) that is sited externally. This in its turn encompasses a ring (68) against which tensile force may be exerted. By virtue of this type of construction the eye hook is sited outside of the sealing area; and for this reason it cannot affect the sealing capability of the pipe sealing pad.

The air-connection (32) in the model manufactured according to FIG. 2 differs from its counterpart in FIG. 1 only by reason of the fact that the pipe fitting (42) is made of rubber. It too blends, in one piece and internally, into a collar (44), but the collar tapers towards the outside. The connections to the ring disk (46) already described are, however, identical. In place of the nut (60) a rubber protrusion (70) which has been vulcanized in place prevents the pipe fitting (42) from being pressed into the internal compartment (34). A section of metal pipe (72) that is fitted with a thread is affixed to the external end of the pipe fitting by means of a hose connection; thus it can be exchanged. The end wall (30) has a concentric ring (74) which thickens the wall at that point and which constitutes an extension of the pipe fitting (42). The feasibility of such rings has been proven for pipe fittings made of metal also (42)—they lessen the possibility that the pipe fittings (42) will be displaced to one side.

The faces of the pad are convex in shape and constructed as spherical like caps; the radius of curvature corresponds to half the length of the gap between both the faces when the pipe sealing pad is inflated in a free state, i.e., when not inserted in a pipe.

I claim:

1. A pipe sealing pad having
   a cylindrical, external sleeve made of reinforced rubber material; and
   two end walls made of rubber material and exhibiting an inner surface each;
said sleeve and said two end walls are linked together by heat vulcanization and define an air-tight compartment; said air-tight compartment is accessible by means of a connection in form of a pipe fitting inserted in an opening in one of the two end walls, and in the compartment the pipe fitting is linked to a ring disk having an inner area, an outer area, and a ring-shaped compensation zone between said inner area and said outer area, said inner area being linked to the pipe fitting; the ring disk is linked to the said inner surface of the end wall exhibiting the opening only in the said outer area, in the ring shaped compensation zone the ring disk is not linked with either the pipe fitting or the inner surface of the said end wall exhibiting the opening; and the ring disk at least in its ring-shaped compensation zone is made of a material that has a greater elasticity than the material of the end wall exhibiting the opening.

2. The pipe sealing pad as in claim 1, wherein the stop in form of a nut or a rubber protrusion is situated on the pipe fitting on an outside surface of the end wall exhibiting the opening, said stop being fitted under initial tension against the end wall, thereby preventing any movement of the pipe fitting into the air-tight compartment.

3. The pipe sealing pad of claim 1, wherein the pipe fitting is a piece of metal that has an external thread and a collar and which collar on an inner surface thereof is connected to the said inner area of the ring disk.

4. The pipe sealing pad of claim 1, wherein the pipe fitting is a rubber component into which a metal pipe section which can be exchanged is attached at the free end which is outside the air-tight compartment, said rubber component having a collar which is taped towards an outer edge and which on a ring-shaped surface is connected to the said inner area of the ring disk.

5. The pipe sealing pad of claim 1, wherein the sleeve is made of a part of a rectangular-shaped section of reinforced rubber material which is reinforced in only one direction, namely axially, this section being longer than is actually required fro the length of the sealing pad and that the end walls are formed of both caps and overlapping sections of the rectangular shaped section which have been bent, and constitute therefore a part of the end walls.

6. The pipe sealing pad of claim 1, wherein the sleeve is made of part of a rectangular section of reinforced rubber material which is reinforced in two directions at right angles to each other by reinforcing threads, the reinforcing threads of both directions forming with the middle axis of the pad the greatest possible angle.

7. The pipe sealing pad of claim 1, wherein reinforcing threads reinforcing the sleeve extend into the end walls and extend almost to the middle axis.

8. The pipe sealing pad of claim 1, wherein the end walls (30) show a convex, spherical configuration, the radius of the spherical configuration is greater than the radius of the cylindrical sleeve and ideally is about half the total length of the pipe sealing pad.

9. The pipe sealing pad of claim 1, wherein to at least one of the end walls is attached an eye hook or a similar component which essentially comprises a disk-shaped anchoring attachment to which something may be anchored or attached, this anchoring attachment being embedded in the end wall.

10. The pipe sealing pad of claim 9, wherein the eye hook is fitted with a ring which, elastically or by means of joints, is connected to the anchoring attachment.

11. The pipe sealing pad of claim 1, wherein the connection is arranged in the middle between the middle axis of the pad and the cylinder of the sleeve of the pad.

* * * * *